United States Patent
Chatterjee et al.

(10) Patent No.: US 10,019,362 B1
(45) Date of Patent: Jul. 10, 2018

(54) SYSTEMS, DEVICES AND METHODS USING SOLID STATE DEVICES AS A CACHING MEDIUM WITH ADAPTIVE STRIPING AND MIRRORING REGIONS

(71) Applicant: American Megatrends, Inc., Norcross, GA (US)

(72) Inventors: Paresh Chatterjee, Fremont, CA (US); Srikumar Subramanian, Suwanee, GA (US); Sankarji Gopalakrishnan, Fremont, CA (US); Senthilkumar Ramasamy, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 49 days.

(21) Appl. No.: 15/145,084

(22) Filed: May 3, 2016

Related U.S. Application Data (60) Provisional application No. 62/157,522, filed on May 6, 2015.

(51) Int. Cl.
  *G06F 11/00* (2006.01)
  *G06F 12/0815* (2016.01)
  *G06F 3/06* (2006.01)
  *G06F 12/0804* (2016.01)
  (Continued)

(52) U.S. Cl.
  CPC ........ *G06F 12/0815* (2013.01); *G06F 3/0619* (2013.01); *G06F 3/0631* (2013.01); *G06F 3/0688* (2013.01); *G06F 11/2069* (2013.01); *G06F 12/0804* (2013.01); *G06F 12/0893* (2013.01); *G06F 2201/805* (2013.01); *G06F 2212/1032* (2013.01); *G06F 2212/222* (2013.01); *G06F 2212/604* (2013.01)

(58) Field of Classification Search
  CPC .. G06F 12/0815; G06F 3/0619; G06F 3/0631; G06F 3/0688; G06F 11/2069; G06F 12/0804; G06F 12/0893
  See application file for complete search history.

(56) References Cited

U.S. PATENT DOCUMENTS

| | | |
|---|---|---|
| 4,989,131 A | 1/1991 | Stone |
| 5,499,337 A | 3/1996 | Gordon |
| 5,680,579 A | 10/1997 | Young et al. |

(Continued)

OTHER PUBLICATIONS

Co-pending U.S. Appl. No. 15/145,099, filed May 3, 2016.
(Continued)

*Primary Examiner* — Jason B Bryan
(74) *Attorney, Agent, or Firm* — Meunier Carlin & Curfman LLC (57) ABSTRACT

An example method for using a plurality of SSDs as a caching medium in a data storage system can include splitting the SSDs into a plurality of cache regions, maintaining a first cache region of the SSDs as a read cache and maintaining a second cache region of the SSDs as a write cache. Additionally, read data can be stored by striping the read data across the SSDs in the first cache region, and dirty write data can be stored by mirroring the dirty write data across the SSDs in the second cache region. The computer-implemented method can also include dynamically adjusting a size of at least one of the first and second cache regions of the SSDs based on an input/output ("I/O") load of the data storage system.

19 Claims, 7 Drawing Sheets

(51) Int. Cl.
*G06F 12/0893* (2016.01)
*G06F 11/20* (2006.01)

(56) References Cited

U.S. PATENT DOCUMENTS

| | | | |
|---|---|---|---|
| 5,732,240 A | 3/1998 | Caccavale | |
| 5,799,324 A | 8/1998 | McNutt et al. | |
| 5,802,561 A * | 9/1998 | Fava | G06F 11/2087 |
| | | | 711/120 |
| 5,892,937 A | 4/1999 | Caccavale | |
| 6,175,900 B1 | 1/2001 | Forin et al. | |
| 6,490,578 B1 | 12/2002 | Burkhard | |
| 6,523,102 B1 | 2/2003 | Dye et al. | |
| 6,553,511 B1 | 4/2003 | DeKoning et al. | |
| 6,606,629 B1 | 8/2003 | DeKoning et al. | |
| 6,651,153 B1 | 11/2003 | Orfali | |
| 7,177,850 B2 | 2/2007 | Argenton et al. | |
| 7,257,684 B1 | 8/2007 | Sinha et al. | |
| 8,219,724 B1 | 7/2012 | Caruso et al. | |
| 8,572,736 B2 | 10/2013 | Lin | |
| 8,631,472 B1 | 1/2014 | Martin et al. | |
| 8,775,741 B1 | 7/2014 | de la Iglesia | |
| 9,256,272 B2 | 2/2016 | Hasegawa et al. | |
| 9,501,420 B2 | 11/2016 | Susarla et al. | |
| 9,632,932 B1 | 4/2017 | Sutardja et al. | |
| 9,798,754 B1 | 10/2017 | Shilane et al. | |
| 2002/0091965 A1 | 7/2002 | Moshayedi | |
| 2004/0148471 A1 | 7/2004 | Wallin et al. | |
| 2004/0260883 A1 | 12/2004 | Wallin et al. | |
| 2005/0278486 A1 * | 12/2005 | Trika | G06F 12/0804 |
| | | | 711/142 |
| 2007/0006013 A1 | 1/2007 | Moshayedi et al. | |
| 2007/0260811 A1 | 11/2007 | Merry et al. | |
| 2009/0204853 A1 | 8/2009 | Diggs et al. | |
| 2009/0210620 A1 * | 8/2009 | Jibbe | G06F 11/108 |
| | | | 711/114 |
| 2009/0228646 A1 | 9/2009 | Edwards et al. | |
| 2010/0070703 A1 | 3/2010 | Sarkar | |
| 2010/0082879 A1 | 4/2010 | McKean et al. | |
| 2010/0088459 A1 | 4/2010 | Arya et al. | |
| 2010/0100664 A1 | 4/2010 | Shimozono | |
| 2010/0122200 A1 | 5/2010 | Merry et al. | |
| 2010/0235670 A1 | 9/2010 | Keller et al. | |
| 2010/0250842 A1 | 9/2010 | Deshpande et al. | |
| 2010/0299547 A1 | 11/2010 | Saika | |
| 2011/0029686 A1 | 2/2011 | Sethi et al. | |
| 2011/0087833 A1 * | 4/2011 | Jones | G06F 12/0866 |
| | | | 711/104 |
| 2011/0173378 A1 | 7/2011 | Filor et al. | |
| 2011/0238922 A1 | 9/2011 | Hooker et al. | |
| 2012/0072698 A1 | 3/2012 | Unesaki et al. | |
| 2012/0185647 A1 | 7/2012 | Dawkins | |
| 2012/0221774 A1 | 8/2012 | Atkisson et al. | |
| 2013/0038961 A1 | 2/2013 | Song | |
| 2013/0122856 A1 | 5/2013 | Kalmbach et al. | |
| 2013/0145223 A1 | 6/2013 | Okada et al. | |
| 2013/0185511 A1 * | 7/2013 | Sassone | G06F 12/0804 |
| | | | 711/119 |
| 2013/0285835 A1 | 10/2013 | Kim et al. | |
| 2013/0318603 A1 | 11/2013 | Merza | |
| 2014/0050002 A1 | 2/2014 | Sun | |
| 2014/0052942 A1 | 2/2014 | Satou | |
| 2014/0089558 A1 | 3/2014 | Baderdinni | |
| 2014/0095547 A1 | 4/2014 | Guo et al. | |
| 2014/0129758 A1 * | 5/2014 | Okada | G06F 12/0246 |
| | | | 711/103 |
| 2014/0143505 A1 * | 5/2014 | Sim | G06F 12/0804 |
| | | | 711/143 |
| 2014/0201442 A1 | 7/2014 | Rajasekaran et al. | |
| 2014/0325166 A1 | 10/2014 | Iyigun et al. | |
| 2015/0026403 A1 | 1/2015 | Ish et al. | |
| 2015/0095567 A1 | 4/2015 | Noda | |
| 2015/0206558 A1 | 7/2015 | Ni et al. | |
| 2015/0278127 A1 | 10/2015 | Takakura | |
| 2015/0370715 A1 * | 12/2015 | Samanta | G06F 12/0891 |
| | | | 711/113 |
| 2016/0004459 A1 | 1/2016 | Oohira | |
| 2016/0011782 A1 | 1/2016 | Kurotsuchi et al. | |
| 2016/0170639 A1 | 6/2016 | Velayudhan et al. | |
| 2016/0276015 A1 | 9/2016 | Bains et al. | |
| 2017/0359371 A1 | 12/2017 | Merza | |

OTHER PUBLICATIONS

Co-pending U.S. Appl. No. 15/145,111, filed May 3, 2016.
Co-pending U.S. Appl. No. 15/145,874, filed May 4, 2016.
Co-pending U.S. Appl. No. 15/145,878, filed May 4, 2016.
Co-pending U.S. Appl. No. 15/145,883, filed May 4, 2016.

* cited by examiner

For each read I/O operation that is not previously stored in a write-through cache and that requests a data chunk with a size less than an SSD block size from a data storage system, read a data block from the data storage system including the data chunk
422

Store the data block in the write-through cache
424

Maintain a dirty bitmap for each SSD block in a write-back cache, where each bit in the dirty bitmap corresponds to an SSD page size
432

For each write I/O operation directed to a data chunk with a size less than the SSD page size in the data storage system, read a data block with a size equal to the SSD page size from a data storage system
434

Modify the data block according to the write I/O operation
436

Store the data block in the write-back cache
438

*FIG. 4D*

SYSTEMS, DEVICES AND METHODS USING SOLID STATE DEVICES AS A CACHING MEDIUM WITH ADAPTIVE STRIPING AND MIRRORING REGIONS

CROSS-REFERENCE TO RELATED APPLICATIONS

This application claims the benefit of U.S. Provisional Patent Application No. 62/157,522, filed on May 6, 2015, entitled "SYSTEMS, DEVICES AND METHODS USING SOLID STATE DEVICES AS A CACHING MEDIUM WITH ADAPTIVE STRIPING AND MIRRORING REGIONS," the disclosure of which is expressly incorporated herein by reference in its entirety.

BACKGROUND

Generally caching of block device data at a relatively lower latency device provides phenomenal performance for both read and write input/output ("I/O") operations. As a read cache device, the data is stored in the cache device until it is replaced with the new data. Until then, the data is read from the cache device for subsequent read I/O operations directed to the same data block. As a write cache, the new data is written to the cache device, and the write I/O operation is informed completed. Later based on policy, the dirty data stored in the cache device is actually persisted to the underlying stable medium. In write-back mode, until the data is persisted to the underlying stable medium, the data in the cache device cannot be guaranteed to be available in future, for example, if the cache device is volatile across power cycle.

Using a solid state device ("SSD") as the cache device helps solve the above problem. For example, using an SSD cache device helps to protect the data during power interruption. Since the SSD is a stable medium, the data availability across power cycle is always guaranteed. When compared to a hard disk drive, SSD devices have phenomenal read and write performance. However, various characteristics of the SSD devices may reduce the I/O performance over time.

The systems, devices and methods described herein use a plurality of SSDs as a caching medium for a data storage system. In particular, the systems, devices and methods use the SSDs in both a write-through cache mode and a write-back cache mode, for example, by splitting the SSDs into a plurality of cache regions and controlling each of the cache regions according to a different cache modes. Cache regions can include at least a portion of each of the SSDs. Additionally, the sizes of the cache regions are dynamically controlled based on the I/O load on the data storage system.

For example, one cache region of the SSDs controlled according to a write-through mode can be used a read cache. The data in this cache region can be striped across the SSDs. Another cache region of the SSDs controlled according to a write-back mode can be used a write cache. The data in this cache region can be mirrored across the SSDs. By mirroring the data in the cache region of the SSDs controlled according to the write-back mode, the data, which may not have been flushed or persisted to the data storage system, is protected in the event of failure of one of the SSDs.

An example computer-implemented method for using a plurality of SSDs as a caching medium in a data storage system can include splitting the SSDs into a plurality of cache regions, maintaining a first cache region of the SSDs as a write-through cache and maintaining a second cache region of the SSDs as a write-back cache. Additionally, data stored in the first cache region can be striped across the SSDs, and data stored in the second cache region can be mirrored across the SSDs. The computer-implemented method can also include dynamically adjusting a size of at least one of the first and second cache regions of the SSDs based on an input/output ("I/O") load of the data storage system.

For example, to dynamically adjust a size of at least one of the first and second cache regions of the SSDs, the computer-implemented method can include expanding a size of the second cache region as the I/O load of the data storage system increases. Alternatively or additionally, the computer-implemented method can include reducing a size of the second cache region as the I/O load of the data storage system decreases.

Optionally, the computer-implemented method can include detecting failure of at least one of the SSDs, and upon detecting the failure, persisting one or more blocks of data stored in the second cache region of an operational SSD to the data storage system. The computer-implemented method can also include maintaining the second cache region of the operational SSD as a write-through cache.

Additionally, upon restoring or replacing the failed SSD, the computer-implemented method can optionally further include restoring the second cache region of the operational SSD to operation as a write-back cache.

Optionally, the computer-implemented method can include tracking valid data stored in the first cache region of the SSDs without maintaining a valid bitmap. For example, the computer-implemented method can include, for each read I/O operation that is not previously stored in the first cache region of the SSDs and that requests a data chunk with a size less than an SSD block size from the data storage system, reading a data block from the data storage system including the data chunk, where the data block has a size equal to the SSD block size. The computer-implemented method can then include storing the data block in the first cache region of the SSDs.

Optionally, the computer-implemented method can include tracking dirty data stored in the second cache region of the SSDs with a dirty bitmap for each SSD block of the second cache region of the SSDs, where each bit in the dirty bitmap corresponds to an SSD page size. For example, the computer-implemented method can include, for each write I/O operation directed to a data chunk with a size less than the SSD page size in the data storage system, reading a data block with a size equal to the SSD page size from the data storage system, where the data block includes the data chunk. The computer-implemented method can then include modifying the data block according to the write I/O operation and storing the modified data block in the second cache region of the SSDs.

Optionally, the computer-implemented method can include receiving a TRIM command from the data storage system in response to invalidation of one or more cache lines of the SSDs and wiping the invalidated cache lines from the first cache region of the SSDs. Alternatively or additionally, the computer-implemented method can include receiving a TRIM command from the data storage system in response to flushing one or more cache lines of the SSDs and wiping the flushed cache lines from the second cache region of the SSDs.

Optionally, the first cache region of the SSDs can be maintained as a RAID 0 array. Alternatively or additionally, the second cache region of the SSDs can be maintained as a RAID 1 array.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for using a plurality of SSDs as a caching medium for a data storage system, it will become evident to those skilled in the art that the implementations are not limited thereto.

Figure 1:
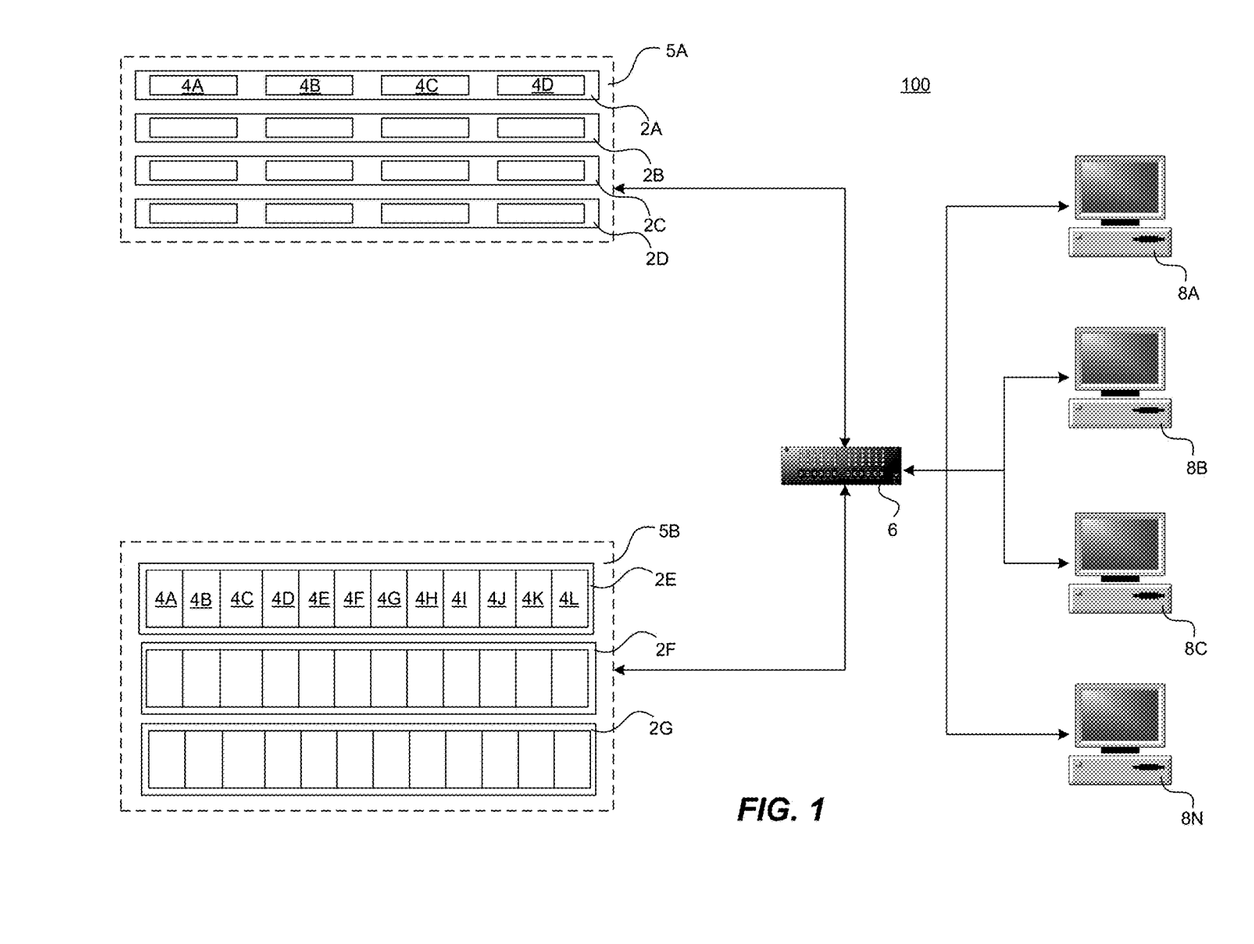
FIG. 1 is a computer architecture and network diagram showing aspects of a computer network and a storage server computer that provides an operating environment for embodiments of the disclosure presented herein.
Figure 2:
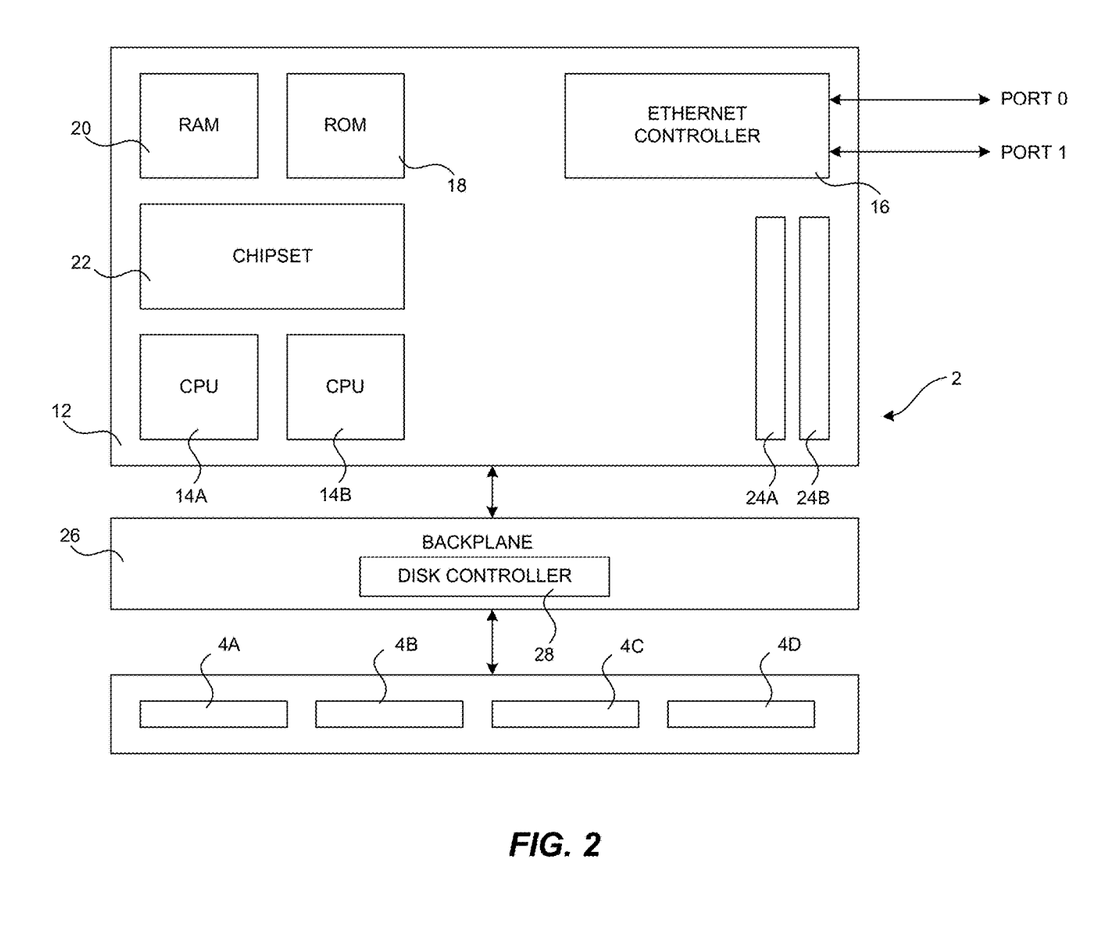
FIG. 2 is a computer architecture diagram illustrating aspects of the hardware of an illustrative storage server computer described herein.
Figure 3A:
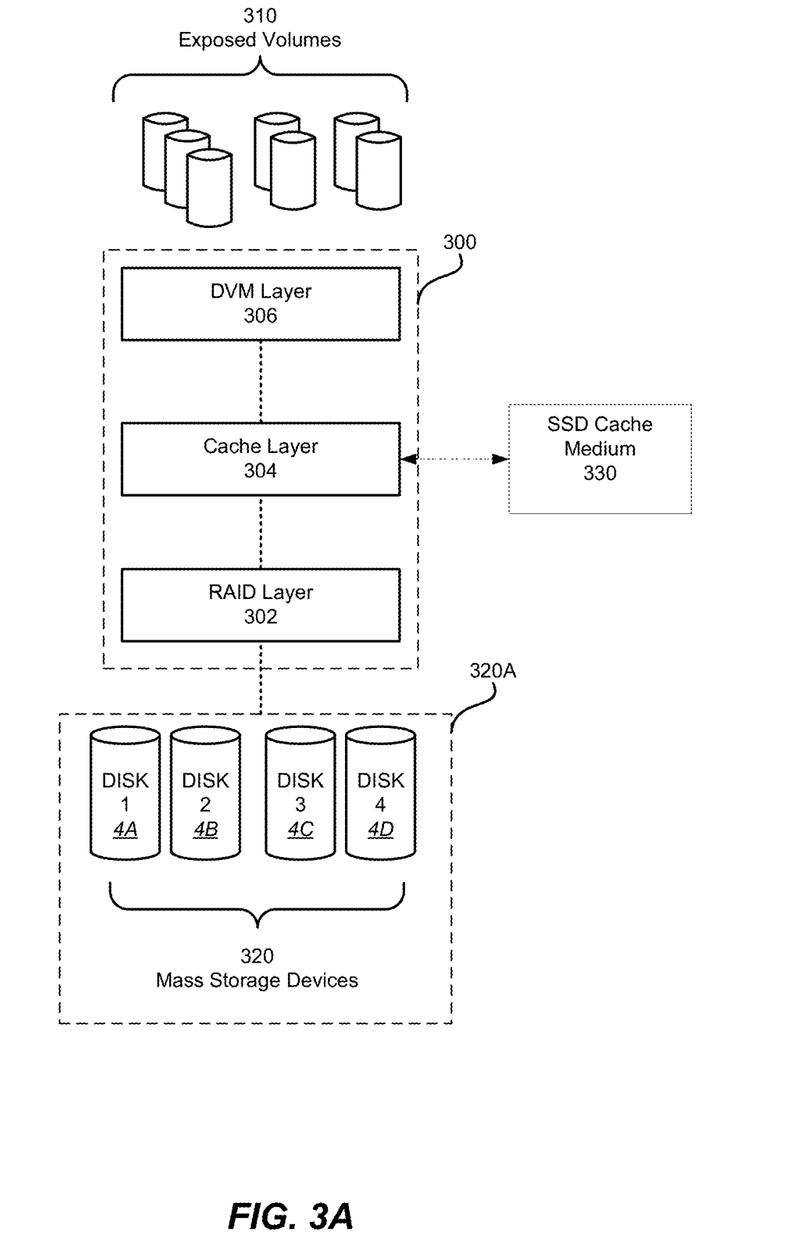
FIG. 3A is a software architecture diagram illustrating various aspects of a storage stack utilized by an illustrative storage server computer described herein.
Figure 3B:
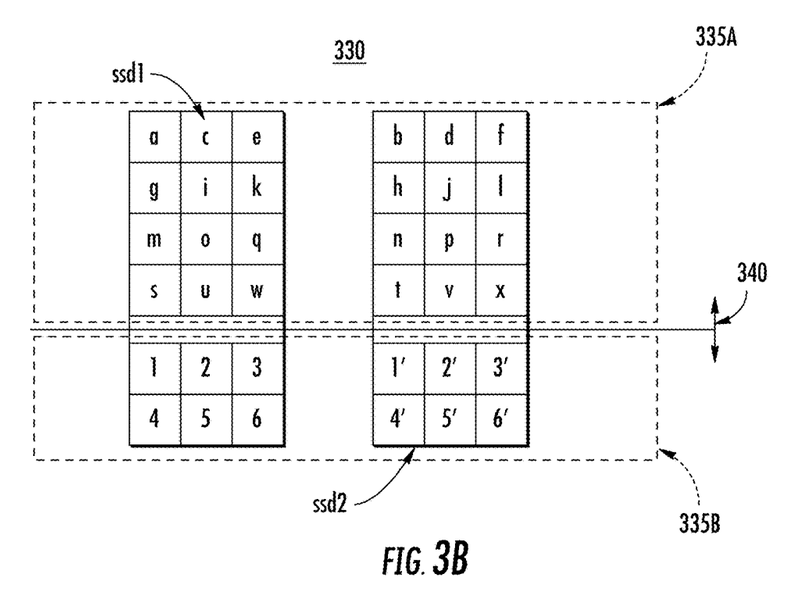
FIG. 3B is a diagram illustrating an example SSD cache medium according to aspects described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein for using a plurality of SSDs as a caching medium for a data storage system. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment ("SATA") interface, a small computer system interface ("SCSI"), a fiber channel ("FC") interface, a SAS interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Referring now to FIG. 3A, an example computer software architecture for practicing the various embodiments presented herein will now be described. The computer software architecture can be implemented in a storage node 2 shown in FIGS. 1 and 2, for example. In particular, FIG. 3A illustrates a storage stack 300 used in the embodiments described herein. The storage stack 300 can include a RAID layer 302, a cache layer 304 and a distributed volume management ("DVM") layer 306. At the top of the storage stack 300, storage volumes 310 are exposed, for example, to the initiators 8A-8N shown in FIG. 1. At the bottom of the storage stack 300 are the mass storage devices 320, such as the disks 4A-4D, that are used to store the data. As discussed above, the mass storage devices are connected to a disk controller such as the disk controller 28 shown in FIG. 2. The disk controller interfaces with the mass storage devices using any standard interface such as SATA, SCSI, FC, SAS interface, etc. for physically connecting and transferring data between computers and the mass storage devices.

The RAID layer 302 abstracts the organization of the RAID array 320A and presents a logical block-level interface to higher layers in the storage stack 300. For example, the RAID layer 302 can implement RAID level 5, where data is striped across the plurality of disks (e.g., disks 4A-4D) in the RAID array 320A. In a four disk array, a RAID stripe includes data block $D_1$ stored on disk 1 (e.g., "4A"), data block $D_2$ stored on disk 2 (e.g., "4B"), data block $D_3$ stored on disk 3 (e.g., "4C") and parity block $P_A$ stored on disk 4 (e.g., "4D"), for example. The parity block $P_A$ can be computed using XOR logic of data block $D_1$, data block $D_2$ and data block $D_3$ (e.g., $P_A = D_1 \oplus D_2 \oplus D_3$). Additionally, the parity blocks in a RAID 5 array are distributed or staggered across the plurality of disks. Although RAID level 5 is discussed above, it should be understood that the RAID layer 302 can implement other RAID levels, such as RAID level 0, 1, 2, 3, 4 or 6.

The DVM layer 306 uses the block-level interface provided by the RAID layer 302 to manage the available storage capacity of the RAID array 320A and service I/O operations initiated by the initiators 8A-8N. The DVM layer 306 can implement a variety of storage management functions, such as volume virtualization, thin provisioning, snapshots, locking, data replication, etc. The DVM layer 306 can be implemented on the storage node 2 in software, hardware or a combination thereof. Volume virtualization provides the facility to create and manage multiple, logical volumes on the RAID array 320A, as well as expand a logical volume across multiple storage nodes within a storage cluster. Thin provisioning provides for the allocation of physical capacity of the RAID array 320A to logical volumes on an as-needed basis. For example, the available physical storage capacity of the RAID array 320A can be divided into a number of unique, equally-sized areas referred to as territories. Optionally, the size of a territory can be one terabyte (TB), a reduced size of 8 megabytes (MB) or any other territory size. Alternatively or additionally, the available physical storage capacity of the RAID array 320A can optionally be further subdivided into units referred to herein as provisions. The provisions can be unique, equally sized areas of the available physical capacity. For example, provisions may be 1 MB in size, a reduced size of 512 kilobytes (KB) or any other provision size. Optionally, a provision can be further subdivided into chunks. For example, the chunk size can be selected as 64 KB, a reduced size of 8 KB or any other chunk size. Snapshots provide functionality for creating and utilizing point-in-time snapshots of the contents of logical storage volumes. The locking functionality allows for synchronizing I/O operations within the storage node 2 or across nodes within the storage cluster. Data replication provides functionality for replication of data within the storage node 2 or across nodes within the storage cluster 2.

The cache layer 304 intercepts read and/or write I/O operations flowing between the RAID layer 302 and the DVM layer 306. The cache layer 304 is configured to read data from and/or write data to an SSD cache medium 330. Additionally, the cache layer 304 can be configured to perform the operations for using a plurality of SSDs as a caching medium for a data storage system (e.g., a data storage system including mass storage devices 320), which are discussed in detail below. The cache layer 304 can be implemented on the storage node 2 in software, hardware or a combination thereof. It should be understood that caching pairs the lower-latency SSD cache medium 330 with the mass storage devices 320. For example, when the SSD cache medium 330 is controlled according to a write-through cache mode, a new write I/O operation (e.g., directed to a data block) is performed synchronously in both the mass storage devices 320 and the SSD cache medium 330. The host (e.g., initiators 8A-8N of FIG. 1) is informed that the new write I/O operation is complete only after the write I/O operation is completed in the mass storage devices 320. A subsequent read I/O operation requesting this data block (e.g., a read data block as used herein) is retrieved from the SSD cache medium 330 instead of the mass storage devices 320. Additionally, when the SSD cache medium 330 is controlled according to the write-through cache mode, a new read I/O operation (e.g., directed to a data block) is stored in the SSD cache medium 330 before returning the requested data block to the host (e.g., initiators 8A-8N of FIG. 1). Alternatively, the new read I/O operation can be performed in parallel, which decreases the response time to host. For example, once the requested data is retrieved from the mass storage devices 320, the retrieved data is stored in SSD cache medium 330 in parallel to returning the requested data block to the host. Similar to above, a subsequent read I/O operation requesting the read data block is retrieved from the SSD cache medium 330 instead of the mass storage devices 320. Alternatively or additionally, when the SSD cache medium 330 is controlled according to a write-back cache mode, a new write I/O operation (e.g., directed to a data block) is performed in the SSD cache medium 330. Then, the host (e.g., initiators 8A-8N of FIG. 1) is informed that the new write I/O operation is complete. At a later time, the data block (e.g., the dirty data block as used herein) is flushed or persisted to the mass storage devices 320 (e.g., the underlying stable medium). Because the SSD cache medium 330 has a lower-latency than the mass storage devices 320, the I/O performance of the system is improved by using the SSD cache medium 330.

Referring now to FIG. 3B, a diagram illustrating an example SSD cache medium 330 according to aspects described herein is shown. The SSD cache medium 330 can include a plurality of SSDs, i.e., SSDs ssd1 and ssd2 as shown in FIG. 3B. It should be understood that the SSD cache medium 330 of FIG. 3B is provided only as an example and that the SSD cache medium 330 can include more than two SSDs. The SSD cache medium 330 can be split into a plurality of cache regions. For example, in FIG. 3B, the SSD cache medium 330 is split into a first cache region 335A and a second cache region 335B. Each of the first and second cache regions 335A and 335B can include at least a portion of each of the SSDs. For example, the first cache region 335A occupies a portion of SSD ssd1 and a portion of SSD ssd2. Similarly, the second cache region 335B occupies a portion of SSD ssd1 and a portion of SSD ssd2. It should be understood that the SSD cache medium 330 can be split into more than two cache regions. In addition, the first cache region 335A and the second cache region 335B can be controlled according to different cache modes as described below.

The first cache region 335A can be maintained in the write-through cache mode, such that the first cache region 335A maintains read data blocks, for example. It should be understood that a cache layer (e.g., cache layer 304 of FIG. 3A) can be configured to manage the first cache region 335A. In the write-through cache mode, a new read I/O operation (e.g., directed to a data block) is stored in the first cache region 335A. Additionally, a new write I/O operation (e.g., directed to a data block) is performed synchronously in the first cache region 335A and the mass storage devices (e.g., the underlying stable medium). In the first cache region 335A, the data can be striped across the SSDs, for example, data blocks a, c, e, . . . and w are stored on SSD ssd1 and data blocks b, d, f, . . . and x are stored on SSD ssd2. Optionally, the first cache region 335A is maintained according to RAID level 0. It should be understood that striping the data across the SSDs in the first cache region 335A increases performance. In addition, a subsequent read I/O directed to one of the data blocks stored in the first cache region 335A can be retrieved from the SSD cache medium 330 instead of the mass storage devices, which increases performance of the data storage system due to the lower latency of the SSD cache medium 330 as compared to the mass storage devices.

The second cache region 335B can be maintained in the write-back cache mode, such that the second cache region 335B maintains dirty data blocks (e.g., data blocks not yet flushed to the mass storage devices), for example. It should be understood that a cache layer (e.g., cache layer 304 of FIG. 3A) can be configured to manage the second cache region 335B. In the write-back cache mode, a new write I/O operation is performed in the second cache region 335B. At a later time, for example according to a flushing policy, one or more data blocks stored in the second cache region 335B can be flushed or persisted to the mass storage devices (e.g., the underlying stable medium). It should be understood that using a write-back cache increases performance of the data storage system due to the lower latency of the SSD cache medium 330 as compared to the mass storage devices. In the second cache region 335B, the data can be mirrored across the SSDs, for example, data blocks 1, 2, 3, . . . and 6 are stored on SSD ssd1 and data blocks 1', 2', 3', . . . and 6' (e.g., mirror copies of data blocks 1, 2, 3, . . . and 6) are stored on SSD ssd2. Optionally, the second cache region 335B is maintained according to RAID level 1. By mirroring data blocks across the SSDs, it is possible to protect this data in the event of failure of either one of SSD ssd1 or SSD ssd2. It should be understood that protection against data loss in the event of device failure is provided in addition to protection against data loss in the event of power failure, which is provided by the non-volatile SSDs. Unlike a write-through cache where the data blocks are always available in the underlying stable medium, the data blocks stored in a write-back cache are not protected against SSD failure until the data blocks are actually flushed to the underlying stable medium. Accordingly, the data stored in the second cache region 335B is mirrored to provide redundancy in the event of SSD failure.

In addition, a size of at least one of the first cache region 335A and the second cache region 335B can be dynamically adjusted based data flow, such as the I/O load of the data storage system. It should be understood that the I/O load of the data storage system (e.g., storage system 100 of FIG. 1) can be tracked or monitored by the data storage system, and this information can be provided to the cache layer (e.g., cache layer 304 of FIG. 3A) so that the cache layer can make dynamic adjustments to the cache regions. For example, in order to boost the performance of the data storage system during intensive I/O operation applications, the cache lines can be dynamically adjusted based on the actual I/O loads and performance needs. For example, during times of write-heavy or I/O-intensive workloads from the host (e.g., initiators 8A-8N), the size of the second cache region 335B can be increased to accommodate the operations. Alternatively or additionally, during times when the host (e.g., initiators 8A-8N)fires more read I/O operations than write I/O operations, the size of the first cache region 335A can be increased to accommodate the operations. This is shown by arrow 340 in FIG. 3B. It should be understood that a cache layer (e.g., cache layer 304 of FIG. 3A) can be configured to dynamically adjust the size of the cache regions. Although the size of the first cache region 335A (e.g., the write-through cache) is larger than the size of the second cache region 335B (e.g., the write-back cache) in FIG. 3B, the size of the second cache region 335B can be expanded when the I/O load on the data storage system increases as described above, which facilitates accommodating more dirty data blocks in the write-back cache. Conversely, the size of the second cache region 335B can be reduced when the I/O load on the data storage system decreases as described above. It should be understood that when the size of the write-back cache increases/decreases, the size of the write-through cache decreases/increases accordingly. Optionally, the dynamic adjustment can be configured using a user-defined policy based on the I/O load of the data storage system. For example, I/O load thresholds can be selected to trigger expansion and/or reduction in the size of the write-back cache.

In another aspect, it is possible to detect failure of at least one of the SSDs. It should be understood that a cache layer (e.g., cache layer 304 of FIG. 3A) can be configured to detect failure of one of the SSDs. As discussed above, data stored in the second cache region 335B (e.g., the dirty data blocks) is mirrored across SSDs ssd1 and ssd2. In the event of failure of one of SSD ssd1 or SSD ssd2, fault tolerance against device failure can no longer be provided because the data is no longer mirrored over two SSDs. Accordingly, one or more of the dirty data blocks stored in the second cache region 335B of the operational SSD (e.g., the non-failed SSD) can be flushed or persisted to the mass storage devices upon detecting failure of one of the SSDs. Optionally, the dirty data blocks can be flushed from the operational SSD to the mass storage devices immediately (e.g., without delay). Thereafter, the logical split between the write-through and write-back caches can be removed. The second cache region 335B of the operational SSD (e.g., the non-failed SSD) can then be maintained as a write-through cache instead of a write-back cache. Accordingly, the entire SSD cache medium 330 can operate according to the write-through cache mode upon failure of one of the SSDs. The entire SSD cache medium 330 can optionally operate in the write-through cache mode until the failed SSD is replaced or restored to service. Optionally, upon restoring or replacing the failed SSD, the second cache region 335B of the operational SSD can be restored to operation as a write-back cache in order to provide redundancy.

In yet another aspect, techniques for optimizing cache management are provided. A cache line is a fixed-size block of cache. Optionally, the fixed size of the cache line can be set to the size of an SSD block, for example, 64 KB. This disclosure contemplates that the cache line can have a size more or less than 64 KB, which is provided as an example. Accordingly, an SSD, which can have a capacity of 200 GB, can support a large number of cache lines (e.g., up to 3,276,800 cache lines with 64 KB block size or up to 26,214,400 cache lines with 8 KB block size). It should be understood that the capacity of the SSD can be more or less than 200 GB, which is provided only as an example. Cache line management can therefore require a large amount of in-core memory. It should be understood that each cache line can be managed using a bitmap such as a valid bitmap (e.g., for tracking or indicating which portions of the data in the cache are valid for data reading operations), a dirty bitmap (e.g. for tracking or indicating which portions of the data in the cache need to be flushed to the underlying stable medium and are valid for data reading operations) or other type of bitmap. Each bit in the bitmap can correspond to a different sector or portion of a cache line. For example, when each bit in a valid bitmap corresponds to a sector of a 64 KB cache line, a 16 byte valid bitmap is required.

As discussed above, because an SSD can support a large number of cache lines, it is desirable to provide a cache management mechanism that tracks portions of the cache line that are valid for data reading operations while reducing the in-core memory footprint required for cache management. It should be understood that this cache management mechanism can be used for tracking the cache lines in the first cache region 335A (e.g., the write-through cache) of the SSD cache medium 330 of FIG. 3B, for example. An example cache management mechanism is to keep each entire cache line valid, for example in the first cache region 335A of SSDs ssd1 and ssd2. By keeping each entire cache line valid, there is no need to maintain valid bit maps for these cache lines. In other words, the mere existence of a cache line in a hash queue can indicate that the cache line is valid for data reading operations. To keep each entire cache line valid, when a read or write I/O operation is directed for a sub-cache line (e.g., a portion of a cache line less than a cache line block size) block of data, a data block with a size equal to the cache line block size can be read from the underlying stable medium and stored in the cache. This eliminates the need for maintaining a valid bitmap for the cache line.

Alternatively or additionally, a dirty bitmap can be maintained, where each bit corresponds to the size of an SSD page, e.g., 4 KB. This disclosure contemplates that the size of an SSD page can be more or less than 4 KB, which is provided only as an example. In other words, each bit in a dirty bitmap can correspond to 4 KB of the cache line. For a 64 KB cache line, the dirty bitmap would only be 16 bits. As discussed above, the dirty bitmap can be used for tracking or indicating which portions of the data in the dirty bitmap need to be flushed to the underlying stable medium and are valid for data reading operations. It should be understood that this cache management mechanism can be used for tracking the cache lines in the second cache region 335B (e.g., the write-back cache) of the SSD cache medium 330 of FIG. 3B, for example. When a write I/O operation is directed to a sub-SSD page size (e.g., sub-4 KB) block of data, a read-modify-write operation can be performed. For example, a missing portion is read from the underlying stable medium, the new write data is appended the read block of data and the data block equal to the SSD-page size is written to the SSD cache.

In another aspect, techniques for performing SSD TRIM commands efficiently are described. In order to extend the lifetime of an SSD, it is desirable to distribute approximately the same number of write operations to every SSD block or cell. To achieve this, wear leveling can be performed inside the SSD. Performing a wear leveling algorithm inside the SSD can ensure that every block is written to approximately an equal number of times as compared to all other SSD blocks, which distributes the write operations approximately equally. In addition, unlike a hard disk drive, overwrites of a logical block in an SSD use new physical locations in the SSD instead of the same physical locations. To erase abandoned SSD pages (e.g., logical blocks in the SSD that have been overwritten), valid pages in the SSD are moved to a new location and then the abandoned pages are erased to accommodate new writes. This process is known in the art as garbage collection. It should be understood that both wear leveling and garbage collection increase the number of times data is written in the SSD, which is known in the art as write amplification, e.g., $$\text{Write Amplification} = \frac{\text{\# times data is written to the SSD}}{\text{\# of times data is written by the host}}.$$

When using an SSD, it is desirable that the SSD is informed about stale or unused data maintained by the host (e.g., initiators 8A-8N of FIG. 1). This can be accomplished using TRIM commands, which inform the SSD of blocks of data no longer in use by the host. For example, when a cache line is no longer needed such as due to cache invalidation of one or more cache lines in the first cache region 335A of the SSD cache medium 330 of FIG. 3B, for example, a TRIM command can be issued to the SSDs ssd1 and ssd2 for the corresponding SSD blocks. Alternatively or additionally, after a dirty write cache such as the second cache region 335B of the SSD cache medium 330 of FIG. 3B, for example, is flushed or persisted to the underlying stable medium (and optionally no read cache is required for the data), a TRIM command can be issued to the SSDs ssd1 and ssd2 for the corresponding SSD blocks. The TRIM command can be issued by the host (e.g., initiators 8A-8N of FIG. 1) to the cache layer (e.g., cache layer 304 of FIG. 3A). The corresponding data blocks in the SSDs can then be wiped internally in response to receiving the TRIM command. Because the wear leveling algorithm does not account for stale data maintained by the host, by keeping the SSD informed about stale data, the SSD can wipe these data blocks and control the amount of the write amplification. Alternatively or additionally, when the SSD is informed of stale data maintained by the host, garbage collection operations on the stale data can be avoid. Accordingly, by keeping the SSD informed of stale data maintained by the host, it is possible to improve the longevity of the SSD.

Figure 4A:
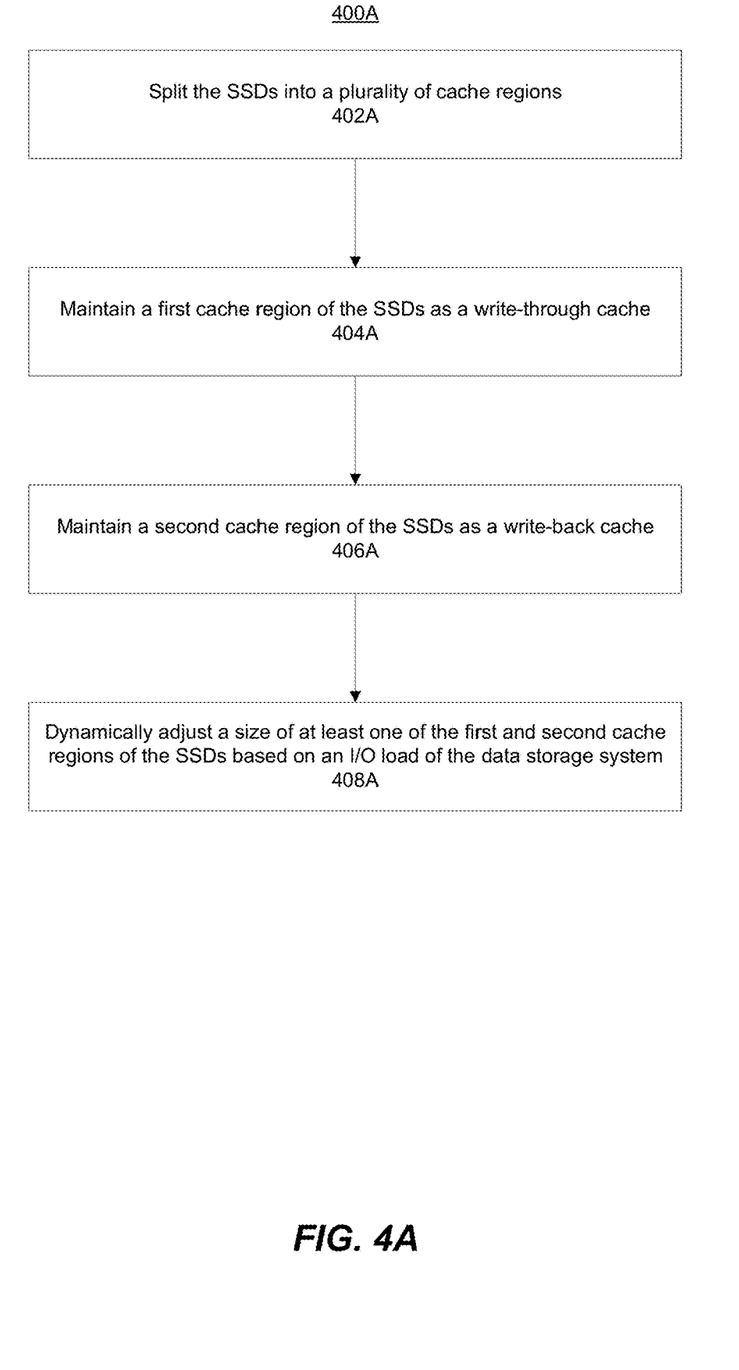
FIG. 4A is a flow diagram illustrating example operations for using a plurality of SSDs as a caching medium for a data storage system according to aspects described herein.

Referring now to FIG. 4A, a flow diagram illustrating example operations 400A for using a plurality of SSDs as a caching medium in a data storage system is shown. At 402A, the SSDs are split into a plurality of cache regions. At 404A, a first cache region of the SSDs is maintained as a write-through cache, and at 406A, a second cache region of the SSDs is maintained as a write-back cache. As discussed above, data stored in the first cache region can be striped across the SSDs, and data stored in the second cache region can be mirrored across the SSDs. At 408A, a size of at least one of the first and second cache regions of the SSDs is dynamically adjusted based on an I/O load of the data storage system. For example, a size of the second cache region can be dynamically adjusted as the I/O load of the data storage system increases or a size of the second cache region can be dynamically adjusted as the I/O load of the data storage system decreases.

Figure 4B:
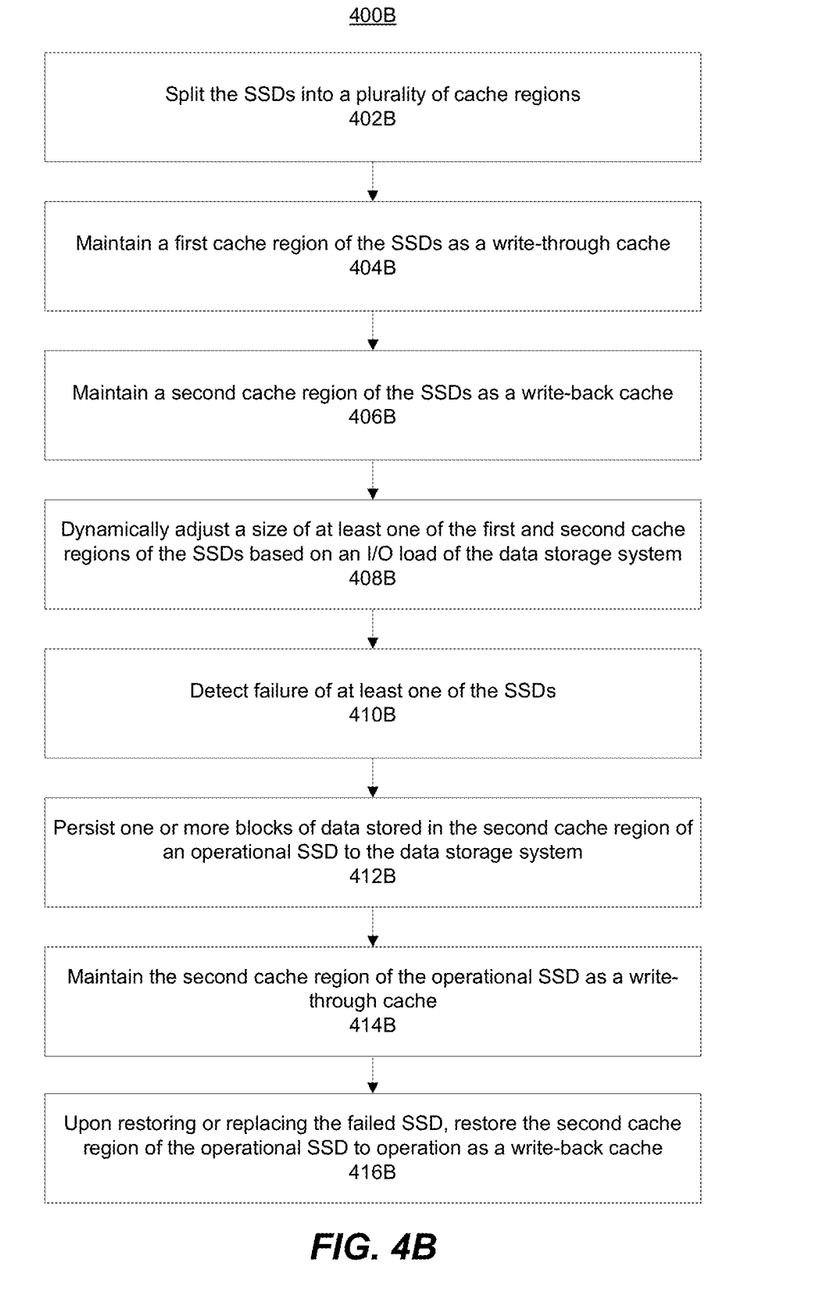
FIG. 4B is another flow diagram illustrating example operations for using a plurality of SSDs as a caching medium for a data storage system according to aspects described herein.

Referring now to FIG. 4B, a flow diagram illustrating example operations 400B for using a plurality of SSDs as a caching medium in a data storage system is shown. Steps 402B-408B are similar to steps 402A-408A of FIG. 4A and are not discussed in further detail below. At 410B, failure of at least one of the SSDs is detected. Then, at 412B, upon detecting the failure, one or more blocks of data stored in the second cache region of an operational SSD can be persisted to the data storage system. Thereafter, the logical split can be removed, and the second cache region of the operational SSD can be maintained as a write-through cache at 414B. Optionally, at 416B, upon restoring or replacing the failed SSD, the second cache region of the operational SSD can be restored to operation as a write-back cache.

Figure 4C:
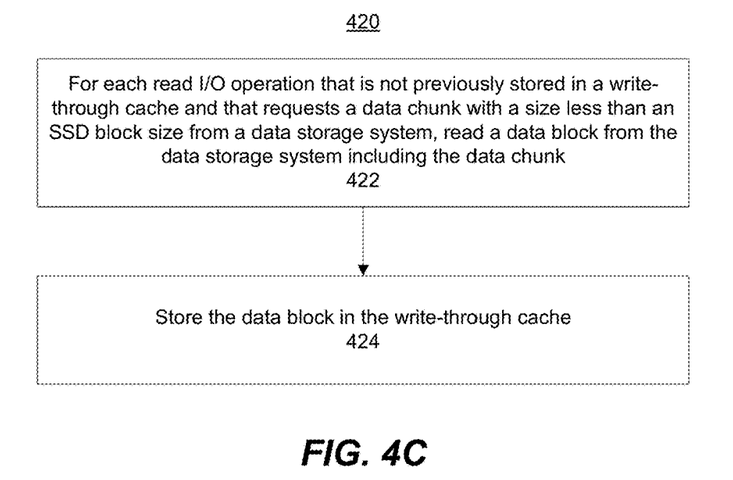
FIG. 4C is a flow diagram illustrating example operations for efficient cache management according to aspects described herein.

Referring now to FIG. 4C, a flow diagram illustrating example operations 420 for efficient cache management is shown. It should be understood that example operations 420 can be used for tracking valid read data in a write-through cache of a plurality of SSDs (e.g., the first cache region 335A of the SSDs ssd1 and ssd2 of FIG. 3B) without maintaining a valid bitmap. At 422, for each read I/O operation that is not previously stored in the write-through cache and that requests a data chunk with a size less than an SSD block size from the data storage system, a data block is read from the data storage system including the data chunk. The data block has a size equal to the SSD block size, i.e., larger than the size of the requested data chunk. Then, at 424, the data block is stored in the write-through cache.

Figure 4D:
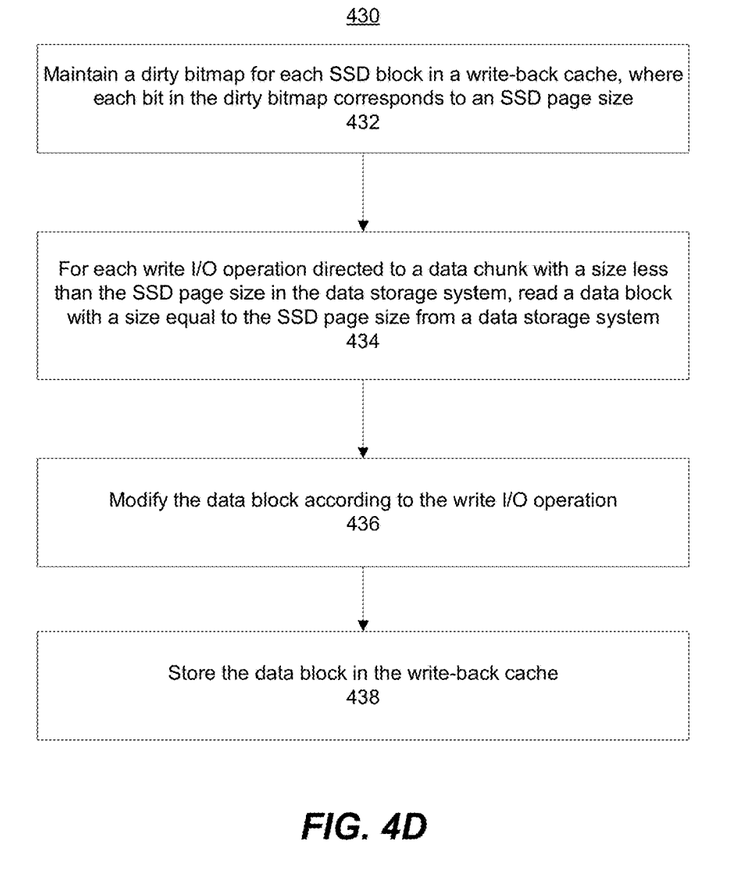
FIG. 4D is another flow diagram illustrating example operations for efficient cache management according to aspects described herein.

Referring now to FIG. 4D, a flow diagram illustrating example operations 430 for efficient cache management is shown. It should be understood that example operations 430 can be used for tracking dirty write data (e.g., data not yet flushed to the underlying stable medium) in a write-back cache of a plurality of SSDs (e.g., the second cache region 335B of the SSDs ssd1 and ssd2 of FIG. 3B). At 432, a dirty bitmap for each SSD block in the write-back cache is maintained, where each bit in the dirty bitmap corresponds to an SSD page size. At 434, for each write I/O operation directed to a data chunk with a size less than the SSD page size in the data storage system, a data block with a size equal to the SSD page size is read from the data storage system. The data block has a size equal to the SSD page size, i.e., larger than the size of the requested data chunk. Then, at 436, the data block is modified according to the write I/O operation and stored in the write-back cache at 438.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for using a plurality of solid state devices ("SSDs") as a caching medium in a data storage system, comprising:
    splitting the SSDs into a plurality of cache regions;
    maintaining a first cache region of the SSDs as a write-through cache, wherein data stored in the first cache region is striped across the SSDs;
    maintaining a second cache region of the SSDs as a write-back cache, wherein data stored in the second cache region is mirrored across the SSDs;
    dynamically adjusting a size of at least one of the first and second cache regions of the SSDs based on an input/output ("I/O") load of the data storage system;
    detecting failure at least one of the SSDs;
    upon detecting the failure, persisting one or more blocks of data stored in the second cache region of an operational SSD to the data storage system; and
    maintaining the second cache region of the operational SSD as a write-through cache.

2. The computer-implemented method of claim 1, wherein dynamically adjusting a size of at least one of the first and second cache regions of the SSDs based on the I/O load of the data storage system further comprises:
    expanding a size of the second cache region as the I/O load of the data storage system increases; or
    reducing a size of the second cache region as the I/O load of the data storage system decreases.

3. The computer-implemented method of claim 1, wherein upon restoring or replacing the failed at least one SSDs, the computer-implemented method further comprises restoring the second cache region of the operational SSD to operation as a write-back cache.

4. The computer-implemented method of claim 1, further comprising tracking valid data stored in the first cache region of the SSDs without maintaining a valid bitmap by:
    for each read I/O operation that is not previously stored in the first cache region of the SSDs and that requests a data chunk with a size less than an SSD block size from the data storage system, reading a data block from the data storage system including the data chunk, wherein the data block has a size equal to the SSD block size; and storing the data block in the first cache region of the SSDs.

5. The computer-implemented method of claim 1, further comprising tracking dirty data stored in the second cache region of the SSDs with a dirty bitmap for each SSD block of the second cache region of the SSDs, wherein each bit in the dirty bitmap corresponds to an SSD page size, by:

for each write I/O operation directed to a data chunk with a size less than the SSD page size in the data storage system, reading a data block from the data storage system including the data chunk, wherein the data block has a size equal to the SSD page size;

modifying the data block according to the write I/O operation; and storing the modified data block in the second cache region of the SSDs.

6. The computer-implemented method of claim 1, further comprising:

receiving a TRIM command from the data storage system in response to invalidation of one or more cache lines of the SSDs; and wiping the invalidated one or more cache lines from the first cache region of the SSDs.

7. The computer-implemented method of claim 1, further comprising:

receiving a TRIM command from the data storage system in response to flushing one or more cache lines of the SSDs to the data storage system; and wiping the flushed one or more cache lines from the second cache region of the SSDs.

8. The computer-implemented method of claim 1, wherein the first cache region of the SSDs is maintained as a RAID 0 array.

9. The computer-implemented method of claim 1, wherein the second cache region of the SSDs is maintained as a RAID 1 array.

10. A non-transitory computer-readable recording medium having computer-executable instructions stored thereon for using a plurality of solid state devices ("SSDs") as a caching medium in a data storage system that, when executed by a storage server computer, cause the storage server computer to:

split the SSDs into a plurality of cache regions;

maintain a first cache region of the SSDs as a write-through cache, wherein data stored in the first cache region is striped across the SSDs;

maintain a second cache region of the SSDs as a write-back cache, wherein data stored in the second cache region is mirrored across the SSDs;

dynamically adjust a size of at least one of the first and second cache regions of the SSDs based on an input/output ("I/O") load of the data storage system;

detect failure of at least one of the SSDs;

upon detecting the failure, persist one or more blocks of data stored in the second cache region of an operational SSD to the data storage system; and maintain the second cache region of the operational SSD as a write-through cache.

11. The non-transitory computer-readable recording medium of claim 10, wherein dynamically adjusting a size of at least one of the first and second cache regions of the SSDs based on the I/O load of the data storage system further comprises:

expanding a size of the second cache region as the I/O load of the data storage system increases; or reducing a size of the second cache region as the I/O load of the data storage system decreases.

12. The non-transitory computer-readable recording medium of claim 10, having further computer-executable instructions stored thereon that, when executed by the storage server computer, cause the storage server computer to, upon restoring or replacing the failed at least one of the SSDs, restore the second cache region of the operational SSD to operation as a write-back cache.

13. The non-transitory computer-readable recording medium of claim 10, having further computer-executable instructions stored thereon that, when executed by the storage server computer, cause the storage server computer to track valid data stored in the first cache region of the SSDs without maintaining a valid bitmap by:

for each read I/O operation that is not previously stored in the first cache region of the SSDs and that requests a data chunk with a size less than an SSD block size from the data storage system, reading a data block from the data storage system including the data chunk, wherein the data block has a size equal to the SSD block size; and storing the data block in the first cache region of the SSDs.

14. The non-transitory computer-readable recording medium of claim 10, having further computer-executable instructions stored thereon that, when executed by the storage server computer, cause the storage server computer to track dirty data stored in the second cache region of the SSDs with a dirty bitmap for each SSD block of the second cache region of the SSDs, wherein each bit in the dirty bitmap corresponds to an SSD page size, by:

for each write I/O operation directed to a data chunk with a size less than the SSD page size in the data storage system, reading a data block from the data storage system including the data chunk, wherein the data block has a size equal to the SSD page size;

modifying the data block according to the write I/O operation; and storing the modified data block in the second cache region of the SSDs.

15. A storage server computer for using a plurality of solid state devices ("SSDs") as a caching medium in a data storage system, the data storage system including a plurality of mass storage devices, the storage server computer comprising:

a processing unit; and a memory operably coupled to the processing unit, the memory having computer-executable instructions stored thereon that, when executed by the processing unit, cause the storage server computer to:

split the SSDs into a plurality of cache regions;

maintain a first cache region of the SSDs as a write-through cache, wherein data stored in the first cache region is striped across the SSDs;

maintain a second cache region of the SSDs as a write-back cache, wherein data stored in the second cache region is mirrored across the SSDs;

dynamically adjust a size of at least one of the first and second cache regions of the SSDs based on an input/output ("I/O") load of the data storage system;

detect failure at least one of the SSDs;

upon detecting the failure, persist one or more blocks of data stored in the second cache region of an operational SSD to the data storage system; and maintain the second cache region of the operational SSD as a write-through cache.

16. The storage server computer of claim 15, wherein dynamically adjusting a size of at least one of the first and second cache regions of the SSDs based on the I/O load of the data storage system further comprises:
  expanding a size of the second cache region as the I/O load of the data storage system increases; or
  reducing a size of the second cache region as the I/O load of the data storage system decreases.

17. The storage server computer of claim 15, wherein the memory has further computer-executable instructions stored thereon that, when executed by the storage server computer, cause the storage server computer to, upon restoring or replacing the failed at least one of the SSDs, restore the second cache region of the operational SSD to operation as a write-back cache.

18. A computer-implemented method for using a plurality of solid state devices ("SSDs") as a caching medium in a data storage system, comprising:
  splitting the SSDs into a plurality of cache regions;
  maintaining a first cache region of the SSDs as a write-through cache, wherein data stored in the first cache region is striped across the SSDs;
  maintaining a second cache region of the SSDs as a write-back cache, wherein data stored in the second cache region is mirrored across the SSDs;
  dynamically adjusting a size of at least one of the first and second cache regions of the SSDs based on an input/output ("I/O") load of the data storage system; and
  tracking valid data stored in the first cache region of the SSDs without maintaining a valid bitmap by:
    for each read I/O operation that is not previously stored in the first cache region of the SSDs and that requests a data chunk with a size less than an SSD block size from the data storage system, reading a data block from the data storage system including the data chunk, wherein the data block has a size equal to the SSD block size, and
    storing the data block in the first cache region of the SSDs.

19. A computer-implemented method for using a plurality of solid state devices ("SSDs") as a caching medium in a data storage system, comprising:
  splitting the SSDs into a plurality of cache regions;
  maintaining a first cache region of the SSDs as a write-through cache, wherein data stored in the first cache region is striped across the SSDs;
  maintaining a second cache region of the SSDs as a write-back cache, wherein data stored in the second cache region is mirrored across the SSDs; and
  dynamically adjusting a size of at least one of the first and second cache regions of the SSDs based on an input/output ("I/O") load of the data storage system; and
  tracking dirty data stored in the second cache region of the SSDs with a dirty bitmap for each SSD block of the second cache region of the SSDs, wherein each bit in the dirty bitmap corresponds to an SSD page size, by:
    for each write I/O operation directed to a data chunk with a size less than the SSD page size in the data storage system, reading a data block from the data storage system including the data chunk, wherein the data block has a size equal to the SSD page size,
    modifying the data block according to the write I/O operation, and
    storing the modified data block in the second cache region of the SSDs.

* * * * *